United States Patent [19]

Burmeister et al.

[11] 4,325,762
[45] Apr. 20, 1982

[54] METHOD AND APPARATUS FOR APPLYING PLASTIC SLEEVES TO CONTAINERS

[75] Inventors: Robert J. Burmeister, Toledo; Russell W. Heckman, Perrysburg; Robert C. Miller, Whitehouse, all of Ohio

[73] Assignee: Owens-Illinois, Inc., Toledo, Ohio

[21] Appl. No.: 159,721

[22] Filed: Jun. 16, 1980

[51] Int. Cl.³ .................... B29C 27/20; B32B 31/26
[52] U.S. Cl. .................... 156/86; 156/499; 156/273.3; 156/272.2; 156/379.8
[58] Field of Search .................. 156/84, 85, 86, 272, 156/380, 499

[56] References Cited

U.S. PATENT DOCUMENTS

| | | | |
|---|---|---|---|
| 3,470,046 | 9/1969 | Verdin | 156/86 |
| 4,024,009 | 5/1977 | Amsden et al. | 156/272 |
| 4,072,553 | 2/1978 | Braker et al. | 156/86 |

*Primary Examiner*—Caleb Weston

*Attorney, Agent, or Firm*—E. J. Holler; M. E. Click; D. H. Wilson

[57] ABSTRACT

The present invention relates to method and apparatus for applying a tubular plastic sleeve or label to a rigid base article or container, such as a glass or plastic bottle. The sleeve may be formed immediately prior to its application and be comprised of oriented, heat-shrinkable, thermoplastic material which is telescopically assembled over the container while both are conveyed through a coincidental aligned path. The container preferably consists of a hollow glass or plastic bottle held upright by its neck or finish portion. The tubular sleeve is made slightly larger in diameter than the container body portion. The sleeve is telescoped upwardly over the container body portion and held in aligned relation during its transport through a heat-shrinking tunnel oven. Electrical heat energy having a high level of infra-red energy is employed to heat-shrink the sleeves in a thermoconstrictive operation during such transport, the sleeve being contracted into snug engagement with the container body portion.

18 Claims, 8 Drawing Figures

METHOD AND APPARATUS FOR APPLYING PLASTIC SLEEVES TO CONTAINERS

BACKGROUND OF THE INVENTION

1. Field of the Invention

This invention relates to the manufacture of composite containers and primarily to the assembly of a hollow sleeve or label onto the body portion of a container for heat-shrinking in situ thereon. The sleeve may be formed immediately prior to its application to the container, or, alternately, the sleeve may be in preformed, flattened condition and taken to a position immediately below the container where it is opened and moved into telescopic alignment with the container held in upright relation. The final shrinking of the sleeve tightly around the body portion of the container is performed by subjecting the sleeve to controlled infra-red radiation supplied by electrical energy.

2. DESCRIPTION OF PRIOR ART

This invention comprises an improvement over the methods and apparatus disclosed in issued U.S. Pat. Nos. 3,767,496, issued Oct. 23, 1974; 3,802,942, issued Apr. 9, 1974; and 3,959,065, issued May 25, 1976, all of which are commonly owned by the same assignee as the present application. In each of these disclosures, a tubular sleeve is formed which is telescopically assembled onto the article from below by a push-up mechanism. None of these disclosures pertain to the thermal constriction of a thin, tubular sleeve of thermoplastic material which is telescoped upwardly over the upright container during their coincidental alignment and retention of the sleeve in place for its selective and controlled heating using infra-red radiation for thermoconstriction.

In many of the previously-disclosed methods and apparatus for making composite containers having an integral plastic sleeve or label thereon, a glass or plastic bottle is loaded onto a conveyor retained by its finish prior to mounting the plastic sleeve. The plastic sleeves are carried on an underlying turret to pass into alignment with the bottles and serially moved vertically upwardly into telescopic assembly over the body portion of the bottles. The sleeves are then carried on the bottles into a heating apparatus such as a gas-fired tunnel oven wherein appropriate physical conditions shrink the sleeves into close-fitting conforming arrangement surrounding the bottle body surfaces where assembled. The heating apparatus has commonly consisted of a gas-fired, hot air oven through which the bottles are passed, the oven temperatures ranging from about 170° F. to 800° F., depending upon the plastic material selected to form the sleeves.

U.S. Pat. No. 3,959,065, owned by the common assignee of this application, discloses method and apparatus which assure against dislocation of the sleeve on the bottle without external handling mechanisms being required to restrain the sleeve in place between its assembly point with the bottle and the shrinking oven. U.S. Pat. No. 4,048,281, also owned by the common assignee of this application, discloses a method of supporting the sleeve from underneath during heating for its shrinkage while both the bottle and sleeve are conveyed, a cooled holding bar being used.

Further, the cap sealing of bottles has been conventionally performed in recent years to provide for reasons of sanitation, pilfer-proofing, safety and appearance, the additional step of placing over and around the neck of the bottle, as well as preferably over at least part of its closure, a tubular sleeve of heat-contracting, synthetic resin material, severed to a prescribed length, and then shrinking the sleeve with hot air to conform to the bottle by thermal contraction. The synthetic resin tubing is usually pressed flat and delivered in rolls in many production processes, and since the tubing may or may not stay fully flattened, particularly where it is comprised of extremely flexible and resilient material, inefficiencies can and do result when the severed lengths of tubing are fitted onto the bottle necks.

It is also possible to apply the tubes around the bottle necks without preforming the material, as taught by U.S. Pat. No. 3,861,918 to Muto; however, such method normally requires the application of a bonding agent to the bottle neck for firm, permanent adherence of the sleeve. The method and apparatus disclosed by this patent are exceedingly more complex and prone to occasionally misapplying the tubular band or label. U.S. Pat. No. 2,852,899 to Murrell discloses a collar feeding mechanism which is designed to remove only the lowermost collar from a nested stack by frictional engagement with its inner surface. The collars are preformed and nested tightly into a stack from which they are deliverable onto the container necks.

Normally when heat-shrinkable thermoplastic sleeves are mounted on container such as glass or plastic bottles having generally cylindrical body portions, with the containers in upright relation for heat-shrinking a relatively large, tubular sleeve therearound, special care must be taken not to overheat the bottle during such heat shrinkage, especially in the case of plastic bottles, which can deform their sidewalls and alter their specific volume. It is to solve this problem, as well as to provide more efficient heat shrinkage that the present invention is primarily directed.

SUMMARY OF THE INVENTION

An object of this invention is to provide a method for heat-shrinking tubular sleeves of thin, thermoplastic material on either glass or plastic bottles, the sleeves being placed on upright containers while both are conveyed in coaxial vertical alignment. The sleeves are preferably comprised of thin film or foam oriented thermoplastic material adapted to shrink in a circumferential direction and the containers preferably consist of glass or plastic bottles having right-cylindrical body portions.

The present invention, as disclosed hereinafter in a specific preferred embodiment, provides both method and apparatus for applying a preformed, extremely-flexible, thin, tubular band or sleeve to major exterior surfaces of an upright container where it is positively restrained prior to subsequent controlled heat shrinking of the sleeve using infra-red energy onto the container surfaces in final conforming relationship. Normally, in the case of glass containers, they are preheated from about 100° F. to 200° F. prior to applying the sleeves. In the case of plastic containers, no significant heating can be tolerated due to their thin sidewalls and heat sensitivity. The invention permits telescopic assembly of the band or sleeve around the container body portion, the sleeves being formed of flexible film, foam or film-foam laminated material. An individual sleeve is opened prior to moving same telescopically in an upward direction over the major exterior surfaces of the container held in upright relation. The band is temporarily retained in place on the container body portion until it is fully heat shrunken using electrical energy into conforming, essentially wrinkle-free, permanent relationship thereon.

The method may employ a rotary turret mechanism adapted to form a tubular thermoplastic sleeve thereon and to open same into container-mounting configuration. The rotary turret permits precise axial and vertical alignment of the container body portion and opened sleeve so that the sleeve may be telescoped to an essentially all-encompassing position around the container body. The present invention relates to the heat-shrinking operation which utilizes improved and controlled heating of primarily the sleeve member, and not the container.

Another feature of the invention is the rotary movement of the combined tubular heat-shrinkable, plastic sleeve surrounding the container body region while the container is supported upright by its neck region in offcenter relation within the heating apparatus for convenient and economical application of the sleeve onto such containers at production speeds. Upright retention of the container and sleeve permits the sleeve to shrink around the body portion without wrinkling due to a gravity effect.

DESCRIPTION OF PREFERRED EMBODIMENT

The apparatus for producing containers with plastic sleeves thereon frequently consists of rotary turret machine (not shown) which is adapted to fabricate the tubular plastic sleeves immediately prior to their mounting on the containers. The containers 10 preferably consist of rigid, hollow, glass or plastic bottles which normally are in unfilled condition just after manufacturing. A web of stock thermoplastic material is commonly delivered from a roll through a suitable set of guide rolls onto a feed drum of the turret machine on which the web is severed into individual blanks for a cutter roll. The cutter roll operates in tangential relation to the feed drum to sever the blanks to a prescribed, uniform length. The blanks are each then wrapped on an individual rotatable mandrel which is mounted on the rotary turret of the machine. Such machine is disclosed in detail in U.S. Pat. No. 3,802,942.

The mandrels are usually mounted in series in equispaced, vertical alignment on the rotary turret which is continuously rotated in a given direction. The sleeves are tightly wrapped on the mandrels and their overlapped ends are joined by a fusion-type axial seal. The forming of the blanks into presized sleeves on the rotating mandrels during the winding and sealing cycles is well known in the art.

After the tubular sleeves are fully formed having a diameter slightly greater than the container body portion and an axial length comparable to the container body height, they are ready to be mounted on the container bodies. The sleeves are preferably formed from a flat, decorated blank immediately prior to their opening into tubular form and being mounted on individual containers.

After the tubular sleeve 12 is formed having an axial seam, it is then combined with the container 10 into a composite package. The sleeve is moved upwardly from the mandrel by a stripping element onto the container with the components in coaxial, vertical alignment during their transport.

The sleeves may be comprised of thin, flexible, oriented, thermoplastic film such as polyvinyl chloride, polyethylene, or polystyrene. The film may have a thickness of from 1½ to 2 mils in the case of polyvinyl chloride, for example. Foamed, oriented polyethylene having a thickness ranging from 8 to 13 mils or foamed oriented polystyrene having a thickness ranging from 7 to 17 mils may also be used to form the sleeves. The sleeves may vary in thickness from ½ to 20 mils, depending upon selection of the desired thermoplastic material. The sleeves may also be comprised of a film-foam, laminated, thermoplastic material having the stated thickness, the film layer on the exterior surface for most desirable printing and decorating of the sleeves.

Figure 1:
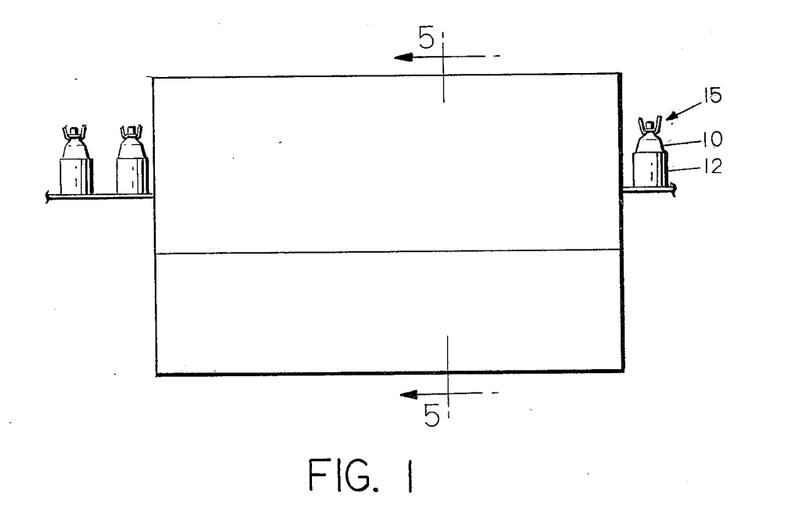
FIG. 1 is a side elevational view of the tunnel oven with a schematic showing of the container conveyor.
Figure 2:
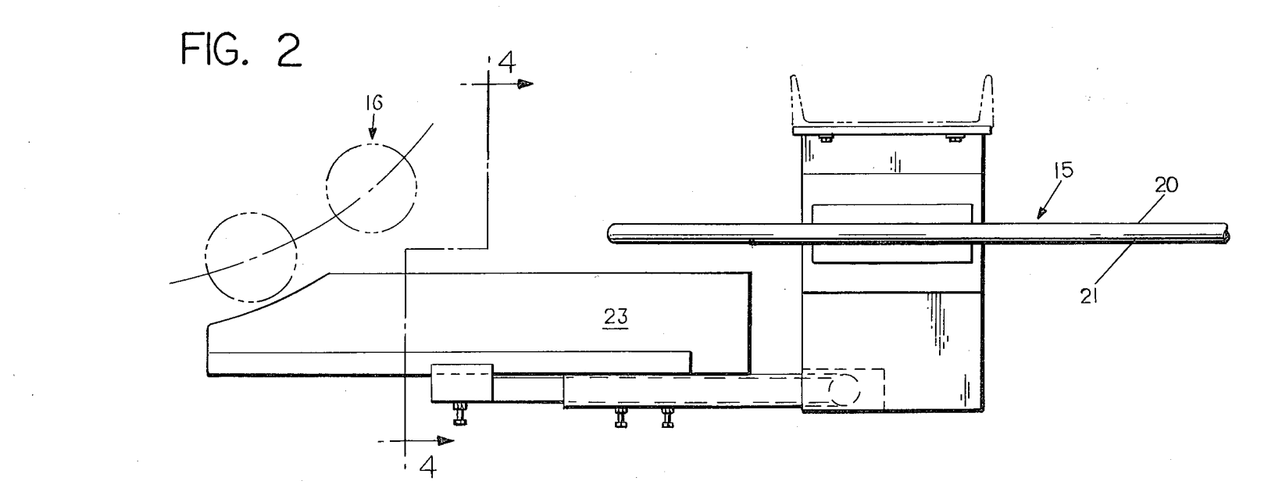
FIG. 2 is a top view of the interior components of the tunnel oven for supporting the sleeve around the container.

FIG. 1 illustrates in part a container retention conveyor 15 which has a lineal reach extending in tangential alignment to sleeve-forming rotary turret designated by the numeral 16 in FIG. 2. The conveyor has a spaced-apart series of container chucking members 17 located in equispaced relation throughout its endless length adapted to grasp and retain the finish portion 11 of a container held in upright relation over the adjacent turret. The plurality of jaw elements of each chuck is adapted to being cammed open and closed by suitable camming means located along the conveyor path. The sleeve 12 is moved upwardly by the stripper element (not shown), mounted on the turret to raise the newly-formed sleeve telescopically around the container body portion when in vertical and axial alignment therewith. It is preferred to preheat the container in the case of glass bottles just prior to application of the sleeve, preferably to a temperature of about 100° F. to 200° F. However, no preheating is required, or desired, in the case of plastic bottles which are heat sensitive due to their normally thin sidewalls.

Figure 3:
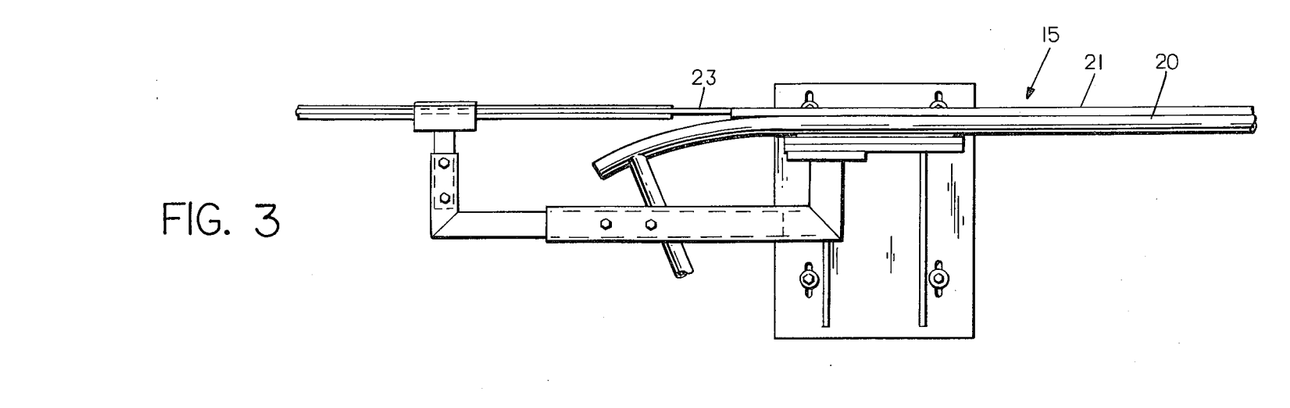
FIG. 3 is a side view showing the interior components of FIG. 2.
Figure 4:
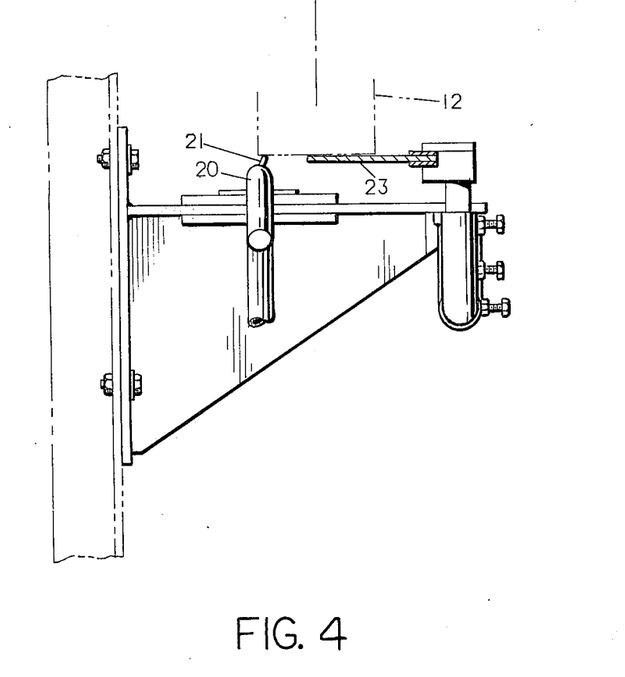
FIG. 4 is a vertical sectional view of the tunnel oven taken along the line 4—4 of FIG. 2.

The sleeve is thus moved telescopically upwardly to surround the container in closely-fitting, loose relation. The lower extremity of the sleeve is retained in precise, vertical alignment with respect to the container body portion in the tunnel oven by a horizontally-extending retention rail 20 as shown in FIGS. 2, 3 and 4. The lower edge of the sleeve is thus positively restrained to permit its uniform shrinkage around the container body portion in precise position. The sleeve is initially held in place on the container by an intermediate flat plate 23 which extends between the turret and the tunnel oven. Rail 20, which is preferably a hollow pipe, has a fin-type upper edge member 21 which physically contacts and restrains the sleeve at one edge during its rotation.

Figure 5:
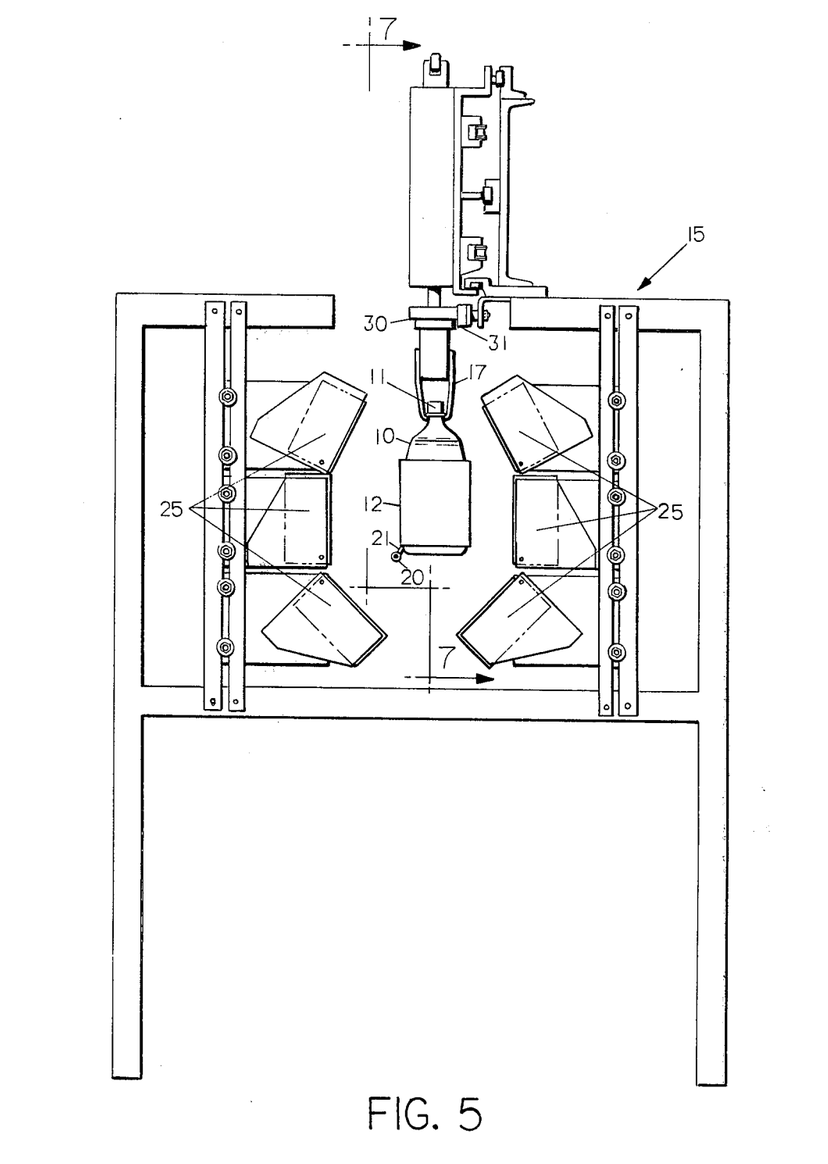
FIG. 5 is a sectional view taken along the line 5—5 of FIG. 1, showing a central region of the tunnel oven and the container chucking mechanism.

As shown in FIGS. 1 and 5, the containers 10 are each retained in upright position held by their neck with a tubular sleeve 12 therearound and moved horizontally into and through a tunnel oven 15. The oven extends horizontally a sufficient distance to permit controlled heat shrinking of the sleeves onto the containers. The neck retention chucks 17 are rotated to rotate the containers and their retained sleeves during passage through the tunnel oven. The oven is open at an upper region to permit transport of the containers, the chucks passing through a lineal, upper opening extending throughout the full length of the oven.

The chucks 17 are each rotated by a friction roller 30 mounted on an intermediate region of the chuck spindle. The roller 30 is fully-rotatable to drive the spindle and the attached chuck 17. The roller 31 is driven by a rubber drive belt 31 which frictionally contacts the roller during its passage over the oven. The drive belt 31 is driven around an upper region of the oven over which the container conveyor extends. The rate of lineal movement of drive belt 31 and the conveyor speed, in combination, control the rate of container rotation.

The oven 15 has a series of three electrical heaters 25, each having considerable horizontal extent mounted in vertical array along each side of the oven. The three heaters 25 are arranged in an arcuate, vertically-aligned pattern facing the top edge, central body and lower edge portions of the sleeve. The heaters comprise similar electrical strip heaters adapted to emit a high level of infra-red radiation.

The heaters comprise the heat-energy radiating source and the thermoplastic sleeve the target. When the source is moved closer to the target, the amount of radiant energy received by the target from the source heater is increased. It follows that the power required to heat the product to the same temperature in the same time, at a closer distance, is less than that required at a further distance.

The heaters are preferably comprised of Watlow Radiant Panels which constitute total area heat sources, or strip heaters, made and sold by the Watlow Company, St. Louis, Missouri. The entire surface area of such panels is heat generating. By distributing the heat generated over a large area, radiant panels operate at low, uniform temperatures. These panels deliver heat so evenly that the target material can be positioned as close as one inch from the surface without hotspotting or streaking. Watlow Panels maintain a constant efficiency rate, and the power input does not need to be increased with time. The subject radiant panels can be mounted much closer to the work further improving efficiency.

At the lower operating temperatures of 800° F. to 1100° F. (compared to 1200° F. to 1600° F. with conventional units) a larger portion of the energy is emitted by the panels in the 3 to 4 micron wavelength range. Such energy is readily absorbed by most materials, including clear and translucent plastics. Less energy is wasted in the short, visible, infrared wavelengths than by the higher temperature units. The one-inch wide emitter strips have a sinuated nickel-chromium resistance wire which is electrically insulated from a surrounding steel sheath by high temperature mica, and preferably have a power of 15 watts per square inch. The emitter is especially treated with a black coating that provides a 93% efficient radiating surface. Normally, an apertured grille member 26 is mounted in front of each heater 25 to further improve heating uniformity and efficiency.

Heat transfer rates for conduction and convection vary directly with the temperature difference, i.e., doubling the temperature difference doubles the heat output. Infra-red radiation transfer rates vary with the fourth power of the absolute temperature, i.e., doubling the temperature difference increases the heat output by sixteen times. The infra-red rays penetrate the surfaces of many materials from 0.010 to 0.050 inch depth. The conducting characteristics of the materials can then carry the heat to the interior.

In the present process, the telescoped sleeve on the container is heated by direct heat transfer. The air between the heaters and the target plastic sleeve is not heated, only the solid target material. The infra-red radiation has 3.5 and 5.8 absorption peaks which generally coincide with the peak absorption range of a number of polymeric materials. Thus, a greater portion of the heat delivered is absorbed in this range. This absorption is also critical to the inks commonly used to decorate the plastic sleeve materials. The wavelengths emitted by the radiant panels are less sensitive to differentiation by different inks, i.e., they are less color sensitive to radiant heating effects.

Whether the oriented sleeves be formed of film, foamed or film-foam laminates, the plastic materials are all acted on in the same general way, by heating using the radiant panels. With such heat-shrinkable materials being similarly acted upon on heating, the container may be a glass or plastic bottle, or also a metal can. The plastic bottles can have the sleeves heat-shrunk thereon without losing or changing volume, or deforming their sidewalls. By proper location of the strip heaters in the arcuate pattern, the heat delivered to the upper neck or finish portion of the bottles can be cut-off or minimized. The sleeves may be formed of a wide variety of thermoplastic materials such as polystyrene, polyethylene or polyvinyl chloride, either in film or foamed condition.

The containers 10 bearing the sleeves 12 are moved through the tunnel oven 15 while rotated by chucks 17. The containers are moved through the lineal tunnel in an off-center arrangement in a straight line while rotated about their axes. The side of the container which is moving against the lineal direction of travel has a higher surface speed than the air its passing through and the emitter. The side which is moving with the lineal direction of travel has a slower surface speed than the air its passing through and the emitter. This causes a heat imbalance from one side of the container to the other. In order to correct this imbalance, the side which is traveling faster past the emitter is moved closer thereto, and thereby the other side is moved further away. The heat loss that is due to such rotation and distance is calculable. Approximately 10% heat loss is due to the air speed when the one sleeve side is not presented to the same single point on the emitter as the other. The sleeve is normally heated from about 145° F. to about 230° F. during the shrinking operation.

In the case of processing about 150 plastic bottles per minute through a 4 to 8 foot oven, about 6.8 seconds of exposure time is required. The containers, in case of 2 liter volume plastic bottles, are located off-center so that the near side is about 3 inches from the emitters and the far side is about 5 inches therefrom. In this manner, the two sides of the container sleeves are subjected to nearly equal amounts of heat for smooth and uniform heat-shrinkage.

As stated, upon entry into the oven, the sleeve is retained at its lower edge by holding rail 20. The sleeve is so retained through about half the length of the oven to ensure its precise positioning on the container body. Once the sleeve starts to contract around the container body, it adheres thereto and the holding rail may be ended. Such adherence or tacking once it occurs prevents vertical movement of the sleeve with respect to the container. During further travel of the container and sleeve through the oven, the radiant heat against upper and lower edge portions, as well as the central body portion of the sleeve causes overall thermal contraction of the sleeve. The sleeve then assumes the full exterior configuration of the container where applied.

Figure 6:
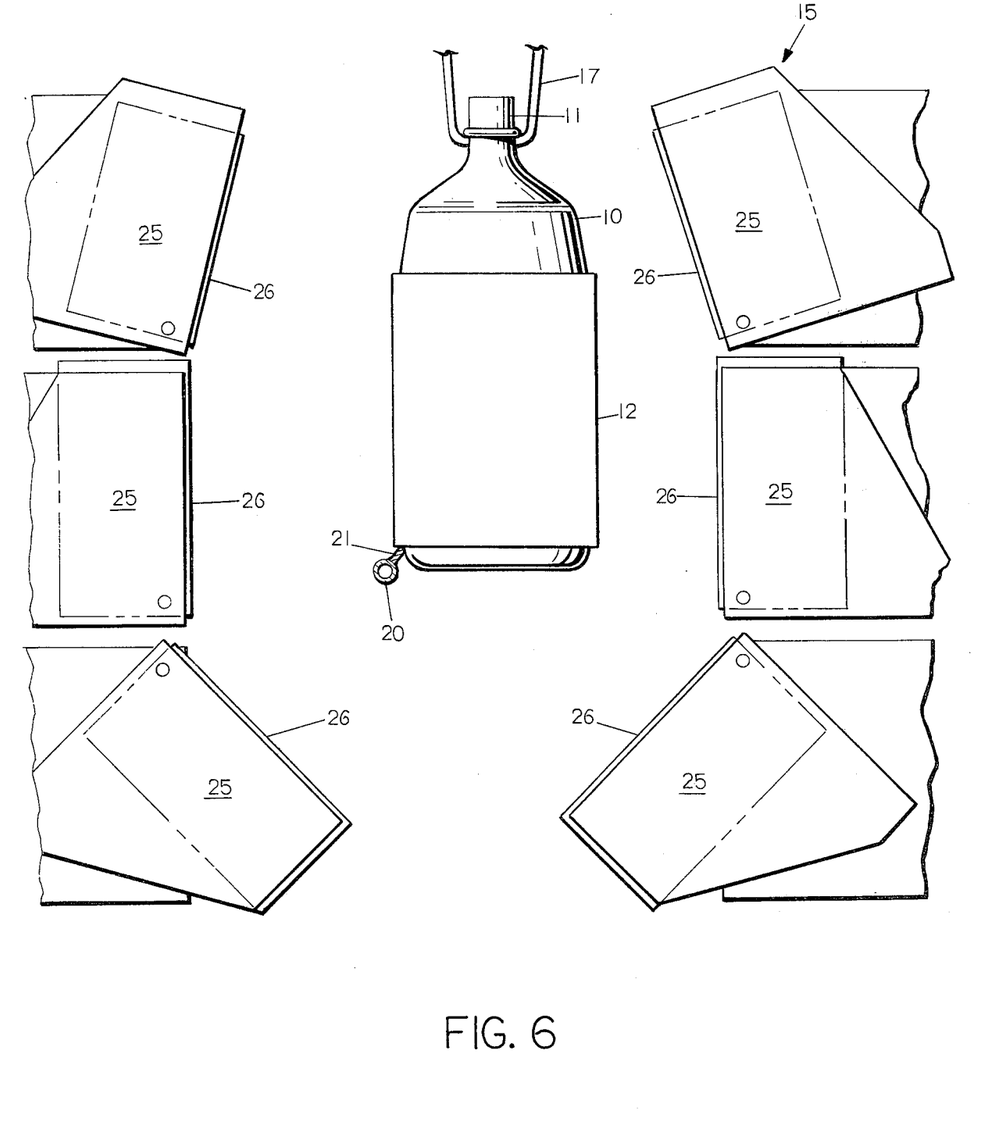
FIG. 6 is a further enlarged view of the tunnel oven similar to FIG. 5, showing a sleeve being heat-shrunk onto a cylindrical container.
Figure 7:
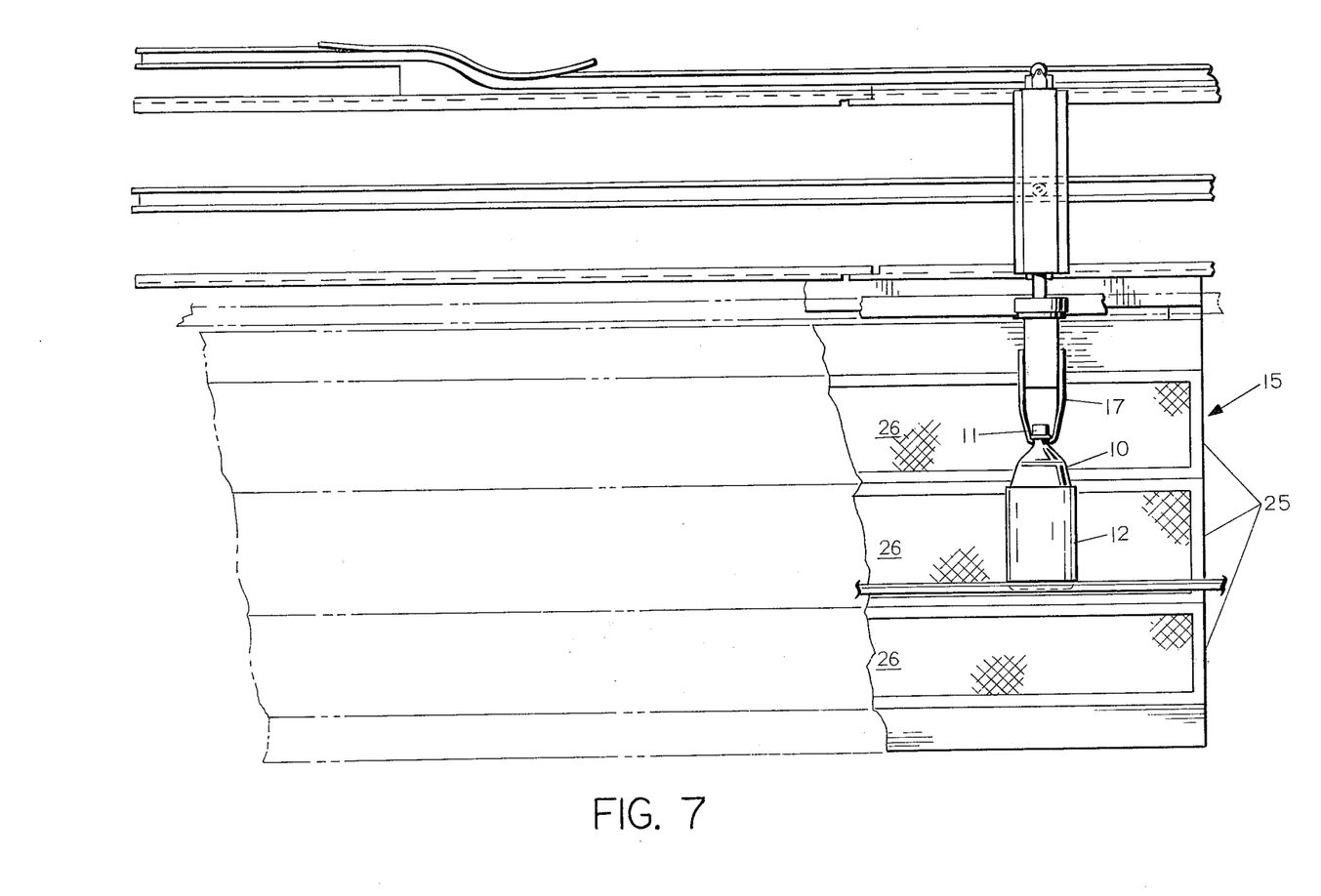
FIG. 7 is a fragmentary, vertical, sectional view of the tunnel oven taken along the line 7—7 of FIG. 5.

FIGS. 4, 5 and 6 show the sleeve 12 being held at its bottom edge during container rotation upon its entry into the oven. At this time, the sleeve loosely surrounds the full body portion of the right-cylindrical container except for the retained neck and finish portion. FIG. 5 shows the position of the container located off-center with the infra-red radiation emitting from the juxtaposed arrays of heaters to shrink the sleeve. The initial tacking and thermoconstriction of the sleeve normally occurs upwardly and downwardly from its central region where the heat is concentrated.

Figure 8:
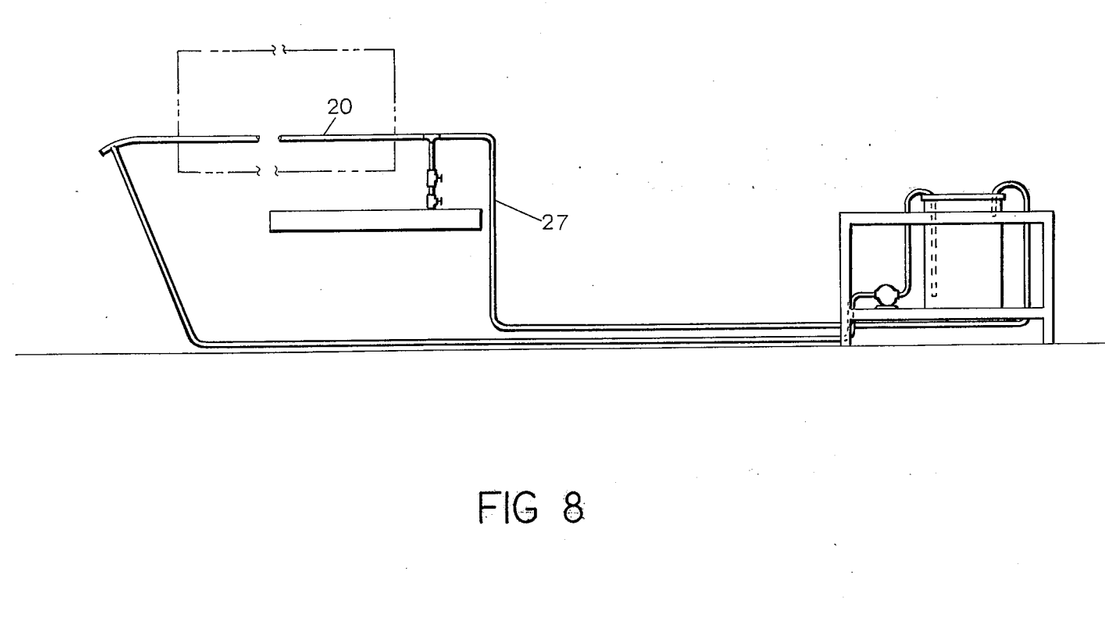
FIG. 8 is a schematic view of the cooling lines for the sleeve retention rail within the tunnel oven.

The holding rail 20 is water cooled, such as by a continuous loop 27 of piping as shown in FIG. 8, to prevent its overheating within the oven.

The aforesaid procedure for heat-shrinking the sleeve onto the container provides an improved labeled container having unique properties. The container is able to be fully surface-covered, as desired, such as where a very thin, flexible, thermoplastic material is employed. The use of thin, oriented, polyvinyl chloride film having a thickness of about 1 to 1½ mils may be readily applied in label form to glass or plastic bottles to smoothly cover the body area without distortion or roughness. The apparatus may be employed interchangably with both glass and plastic bottles with only minor adjustments being made.

Various modifications may be resorted to within the spirit and scope of the appended claims.

I claim:

1. In the method of labeling containers such as glass or plastic bottles, and the like, which includes the steps of providing a tubular sleeve of heat-shrinkable, thermoplastic material, retaining the said container in upright, vertical relation by grasping the upper portion of said container, transporting the said container and sleeve simultaneously in vertically-aligned relation, telescoping the said sleeve upwardly over the body portion of said container during their simultaneous transport in vertical alignment, the improvement comprising the steps of rotating the container about its axis whie bearing said sleeve, retaining the lower edge of said sleeve to maintain the sleeve in alignment with respect to the body portion of said container, and transporting said rotating container and sleeve along a path between at least two sources of heat while maintaining said sleeve a greater distance from the at least one source of heat on one side of said path than from the at least one source of heat on the opposite side of said path to thermally contract the sleeve into snug engagement with said container.

2. The method in accordance with claim 1, including the step of heating said sleeve from opposing sides using juxtaposed infrared energy heat source.

3. The method in accordance with claim 1, wherein said container comprises a cylindrical plastic bottle and said sleeve comprises an oriented, polyolefin material having its major orientation in a circumferential direction.

4. The method in accordance with claim 1, wherein said container comprises a cylindrical glass bottle and said sleeve comprises an oriented, polyolefin material having its major orientation in a circumferential direction.

5. The method in accordance with claim 1, including the step of retaining the lower edge of said sleeve by a horizontal holding bar during the initial portion of horizontal transport of said container and sleeve through said heating zone.

6. The method in accordance with claim 1, wherein said tubular sleeve has an axial dimension approximating the height of the container body portion for shrinkage around its major exterior surface areas.

7. The method in accordance with claim 1, wherein said tubular sleeve has a diameter slightly greater than the diameter of said container body portion and a length comparable to the container body portion.

8. The method in accordance with claim 1, including the step of heating the sleeve by infrared energy from three lineal heaters located in symmetrical arcuately-shaped vertical rows on each side of said transported container and sleeve to directly face essentially all portions of said sleeve for its uniform shrinkage in snug relation around said container.

9. In the method of labeling containers such as glass or plastic bottles, and the like, which includes the steps of providing a tubular sleeve of heat-shrinkable, thermoplastic material, retaining the said container in upright, vertical relation by grasping the upper portion of said container, transporting the said container and sleeve simultaneously in vertically-aligned relation, telescoping the said sleeve upwardly over the body portion of said container during their simultaneous transport in vertical alignment, the improvement comprising the steps of rotating the container about its axis while bearing said sleeve, retaining the lower edge of said sleeve to maintain the sleeve in alignment with respect to the body portion of said container, heating said sleeve by infrared energy from three lineal heaters located in symmetrical, arcuately-shaped rows on each side of said transported container and sleeve to directly face essentially all portions of said sleeve for its uniform shrinkage in snug relation around said container, and transporting said container and sleeve in off-center relation while rotating the same between the two opposing rows of three lineal heaters, each row arranged in vertical arcuate array facing the medial portion and upper and lower edge portions of said sleeve.

10. In the method of labeling containers such as glass or plastic bottles, and the like, which includes the steps of providing a tubular sleeve of heat-shrinkable, thermoplastic material, retaining the said container in upright relation by grasping the uppermost finish portion of said container, transporting the said container and said sleeve simultaneously in vertically-aligned arrangement with said sleeve retained beneath said container, telescoping said sleeve upwardly over the body portion of said upright container to surround its major exterior surfaces, said sleeve having a diameter slightly greater than said container body portion and a length comparable to said container body portion, and rotating the said container and sleeve axially during their transport, the improvement comprising the step of heat-shrinking said sleeve snugly around said body portion using at least two infrared-emitting electrical heaters mounted in juxtaposed relation within a tunnel oven on opposing sides of said container and sleeve during their rotating transport while maintaining said sleeve a greater distance from the at least one heater on one side of said container and sleeve than from the at least one heater on the opposite side of said container and sleeve.

11. In the method of labeling containers such as glass or plastic bottles, and the like, which includes the steps of providing a tubular sleeve of heat-shrinkable, thermoplastic material, retaining the said container in upright relation by grasping the upper most finish portion of said container, transporting the said container and said sleeve simultaneously in vertically-aligned arrangement with said sleeve retained beneath said container, telescoping said sleeve upwardly over the body portion of said upright container to surround its major exterior surfaces, said sleeve having a diameter slightly greater than said container body portion and a length comparable to said container body portion, and rotating the said container and sleeve axially during their transport, the improvement comprising the step of heat-shrinking said sleeve snugly around said body portion using infrared-emitting electrical heaters mounted in juxtaposed relation within a tunnel oven on opposing sides of said container and sleeve during their rotating transport, and transporting the said container and sleeve in off-center relation between two rows of opposing infrared-emitting electrical heaters for uniformly heat-shrinking of said sleeve onto said container.

12. The method in accordance with claim 10, including the step of retaining the sleeve in telescoped relation with respect to said container body portion by a holding bar extending through at least the inlet region of the heat-shrinking zone of said tunnel oven contacting the lower edge of said sleeve during rotating transport of said container and sleeve.

13. The method in accordance with claim 10, including the step of directing infrared energy at the central body portion and upper and lower edge portions of said sleeve from two juxtaposed rows of three lineal-strip electrical heaters arranged in vertically-aligned arcuate arrangement facing said sleeve from opposing sides.

14. Combined apparatus for heat-shrinking a tubular sleeve of heat-shrinkable oriented thermoplastic material around a container comprising a heating tunnel oven having open ends, means for transporting the combined sleeve and container along a path therethrough, two rows of lineal electrical heating elements mounted in multi-component array in juxtaposed arcuate relation on opposing sides of said path in said tunnel oven, each said heating element adapted to emitting infrared radiation for rapid heat-shrinking of said oriented sleeve snugly and smoothly around said container, said path of said combined sleeve and container being a greater distance from one of said rows of lineal electrical heating elements than from the opposite one of said rows of lineal electrical heating elements.

15. The combined apparatus in accordance with claim 14, including a holding bar extending through a major inlet portion of said tunnel oven adapted to retain a lower edge of said sleeve prior to its heat-shrinking around said container.

16. The combined apparatus in accordance with claim 14, wherein each row of juxtaposed electrical heating elements have their central component in vertical alignment, and the upper and lower components in downwardly and upwardly facing alignment, respectively, in an arcuate pattern facing said sleeve during its combined transport with said container.

17. The combined apparatus in accordance with claim 15, wherein said holding bar is water-cooled and extends horizontally a substantial distance within the inlet portion of said tunnel oven.

18. The combined apparatus in accordance with claim 14, wherein said electrical heating elements are adapted to emit a high-level of infrared energy in a range adapted to high absorption by the said thermoplastic material.

* * * * *